United States Patent Office 3,487,108
Patented Dec. 30, 1969

3,487,108
PROCESS FOR THE PREPARATION OF
BENZENE CARBOXYLIC ACIDS
Sheldon Chibnik, Plainfield, N.J., and Gerassimos Frangatos, Patissia, Athens, Greece, assignors to Mobil Oil Corporation, a corporation of New York
No Drawing. Filed Oct. 22, 1965, Ser. No. 502,521
Int. Cl. C07c 63/00
U.S. Cl. 260—524                                    9 Claims

ABSTRACT OF THE DISCLOSURE

Superior product yields are obtainable by employing a reaction medium containing proportions of both a lower alkyl ester of a lower fatty acid (e.g. ethyl acetate) and the usual lower fatty acid (e.g., acetic acid) in the liquid phase oxidation catalyzed by a dissolved cobalt compound (e.g., cobalt acetate tetrahydrate) of a methyl-substituted benzene compound (e.g., p-xylene) at elevated temperatures to the corresponding aromatic carboxylic acid (e.g., terephthalic acid) by means of gaseous oxygen; and activators (e.g., methyl ethyl ketone and acetaldehyde) may be used to shorten the induction period.

---

This invention relates to the preparation of benzene carboxylic acids. In one specific aspect, it relates to an improvement in the preparation of such acids by the catalytic oxidation of methyl-substituted benzene compounds.

The cobalt-catalyzed oxidation of methyl-substituted benzene compounds to the corresponding carboxylic acids is described in U.S. 2,853,514 and 3,036,122. In carrying out such a process, the methyl- or polymethyl-substituted benzene compound to be oxidized is dissolved in a saturated fatty acid having from 2 to 4 carbon atoms. Acetic acid is the preferred solvent but a mixture of two or three of such acids, i.e., acetic, propionic, and/or butyric acids, may also be employed. The reactant methyl-substituted benzene compound is generally present in an amount ranging from about 2% to about 20%, preferably about 10%, by weight of the fatty acid solvent.

The cobalt catalyst is generally present in the reaction mixture as a soluble cobalt alkanoate salt, often corresponding to the fatty acid solvent employed, i.e., cobalt acetate, propionate or butyrate or mixtures thereof. The catalyst is present in a catalytic amount, and usually in an amount of from 0.1% to 1% by weight of cobalt metal, based on the weight of the fatty acid solvent. The amount of water initially present in the reaction is generally in the range of from about 1% to about 10% by weight of the reaction mixture. As a reaction activator, a methylenic ketone such as methyl ethyl ketone, methyl n-propyl ketone, diethyl ketone, 2,4-pentanedione or 2,5-hexanedione is used, with methyl ethyl ketone being the preferred activator. The concentration of the activator should be at least about 1%, and preferably in the range of from 3% to 7%, by weight of the fatty acid solvent.

The oxidation is carried out by contacting the reaction mixture with a gas containing molecular oxygen at partial pressures of oxygen ranging from about 100 to about 1,000 pounds per square inch, preferably in the range of from 200 to 400 pounds per square inch. If the oxidation is carried out at atmospheric pressure, the optimum reaction time is about 16 to 24 hours. While air, or air enriched with oxygen, may be used to advantage, gaseous oxygen of commercial purity is preferred. Best results are generally obtained at reaction temperatures of about 130° C. and very good results are obtained at reaction temperatures between 125° C. and 140° C. The yield of product falls off somewhat at temperatures above 140° C. and more severely above about 145° C. Using the optimum conditions described above, the desired oxidation occurs rapidly, generally within a few minutes, with a high degree of conversion of the reactant methyl-substituted benzene compound to the corresponding benzene carboxylic acid product by oxidation of the methyl groups to carboxylic acid groups.

The oxidation is generally allowed to proceed at gas pressures of from 100 to 500 pounds per square inch for a few minutes or up to about an hour or two, being preferably terminated before all of the readily reactive methyl groups in the reaction mixture have been oxidized to carboxylic acid groups. The reaction time is usually controlled to avoid exceeding the period require for a predetermined degree of oxidation, which is generally not more than 95% of the methyl groups in the starting material. This results not only in efficient and rapid oxidation of the starting material to the desired benzene carboxylic acid, but also in preserving a substantial portion of the methylenic ketone activator in the reaction mixture which, after suitable treatment, can be recycled for use in a subsequent oxidation reaction. The resultant benzene carboxylic acid can be separated from the reaction mixture in any conventional manner, e.g. by filtration, and the remainder of the mixture is generally prepared for recycle.

It is an object of the present invention to provide an improved process for the preparation of benzene carboxylic acids by the cobalt-catalyzed oxidation of the corresponding methyl-substituted benzene compound and one which avoids the necessity of using a methylenic ketone activator.

It has now been discovered that the foregoing objectives can be accomplished by reacting a methyl-substituted benzene compound with a free-oxygen-containing gas in the presence of a soluble cobalt salt catalyst and in a fatty acid solvent containing a lower alkyl ester of a fatty acid. Accordingly, the present invention provides a process for the preparation of a benzene carboxylic acid which comprises heating with oxygen a reaction mixture containing a methyl-substituted benzene compound, a catalytic amount of a soluble cobalt salt, a 2–4 carbon atom-containing fatty acid, and a lower (preferably $C_2$–$C_4$) alkyl ester of a fatty acid (preferably a 2–4 carbon atom-containing fatty acid).

As in the prior art process described hereinbefore, the product benzene carboxylic acid can be separated from the reaction mixture and purified by any of a number of conventiontal procedures, e.g. filtration, and the process can be carried out batchwise or as a cyclic process, e.g. by reconstituting and recycling the reaction mixture following removal of the benzene carboxylic acid product. Also as in the aforedescribed prior art process, the fatty acid component of the solvent medium of the process of this invention can be acetic, propionic or butyric acid or a mixture of two or three of such acids.

The ester which is used in the process of this invention is, as aforesaid, a lower alkyl ester of a fatty acid. Preferably, the process is carried out with an ester of a 2–4 carbon atom-containing fatty acid, i.e., acetic, propionic or butyric acid. The lower alkyl group which represents the residue of an alcohol which could be reacted with a fatty acid to produce such an ester should contain at least two and preferably 2–4 carbon atoms. Thus, in preferred embodiments, the process utilizes ethyl, n-propyl, isopropyl, n-butyl and/or sec-butyl esters of acetic, propionic and/or butyric acid, e.g. ethyl acetate, ispropyl acetate, sec-butyl acetate, ethyl propionate, n-propyl propionate, n-butyl propionate, ethyl butyrate, isopropyl butyrate, sec-butyl butyrate, or a mixture of two or more of such esters. When the fatty acid component of the solvent medium is acetic acid, ethyl acetate or sec-butyl acetate can be conveniently used in the process of this invention. However, the process can be alternatively carried out with a 2–4 carbon atom-containing fatty acid and an ester of another fatty acid, e.g. acetic acid and ethyl propionate, propionic acid and sec-butyl acetate, etc.

The ester can be present in the reaction mixture in any amount sufficient to increase the yield of product benzene carboxylic acid over the yield obtainable by carrying out the process with the use of an equal volume of a 2–4 carbon atom-containing fatty acid in place of the lower alkyl ester. In general, the use of only a small proportion of the ester, e.g. three milliliters of ester or less per 100 milliliters of the fatty acid will provide only a small increase in the yield of benzene carboxylic acid product, whereas the use of greater proportions of the ester will generally provide correspondingly greater increases in the benzene carboxylic acid yield. Preferably, the reaction mixture will initially contain sufficient fatty acid to maintain the cobalt salt catalyst in solution, i.e., at least an amount of the fatty acid sufficient to dissolve substantially all of the cobalt salt which would not dissolve in the ester component of the mixture. However, some of the ester may be oxidized during the course of the process to provide additional fatty acid which would supplement the amount of fatty acid originally present in the reaction mixture. Normally, best results will be obtained if the fatty acid and the lower alkyl ester are each initially present as between about 25% and about 75% by volume of the reaction mixture.

While the process of the present invention avoids the necessity of using an activator, the use of activators is not excluded from the practice thereof. The markedly improved yield of product benzene carboxylic acid which is obtained when a fatty acid and a lower alkyl ester of a fatty acid are used in the proportions specified above and in the absence of a methylenic ketone activator are likewise obtained, in many instances after shorter periods of oxidation of the reaction mixture, when an activator such as a methylenic ketone or aldehyde is included in the reaction mixture.

The process of this invention is applicable to the oxidation of benzene compounds having one or more methyl substituents on the benzene nucleus, and results in the formation of benzene carboxylic acids by the oxidation of the methyl groups to carboxylic acid groups. The process of the present invention is particularly applicable to the preparation of benzene dicarboxylic acids. Typical starting materials are such methyl-substituted benzenes as toluene, m-xylene, p-xylene, mesitylene, durene, or mixtures containing such compounds. The methyl-substituted benzene starting material may also contain other nuclear substituents which are inert to the oxidation reaction, such as chlorine, bromine, fluorine, or a nitro, carboxyl, alkoxy, aryloxy, or tertiary alkyl group. Typical oxidations include that of toluene to benzoic acid, m-xylene or m-toluic acid to isophthalic acid, p-xylene or p-toluic acid to terephthalic acid, 1,5-dimethyl-2-chlorobenzene to chloroisophthalic acid, and 1,4-dimethyl-2-nitrobenzene to nitroterephthalic acid, etc. The process of the present invention is especially advantageous when the desired product is a dicarboxylic acid which is insoluble in the reaction mixture and can be easily separated therefrom, e.g. by filtration, with monocarboxylic acids and other intermediate oxidation products remaining in the solution wherein they can be oxidized further at a relatively high rate.

The present invention is further illustrated by the following examples:

EXAMPLE I

This example illustrates a preferred cobalt-catalyzed oxidation of a methyl-substituted benzene compound to the corresponding benzene carboxylic acid compound using a reaction mixture containing a 2–4 carbon atom-containing fatty acid and a lower alkyl ester of a fatty acid in accordance with the process of this invention.

A one gallon stirred autoclave was charged with 106 grams of p-xylene, 25 grams of cobalt (II) acetate tetrahydrate, 500 milliliters of glacial acetic acid and 500 milliliters of ethyl acetate and then heated to 130° C. under a pressure of 250 pounds per square inch of oxygen. Oxygen absorption started within 130 minutes and a vigorous exothermic reaction ensued. The temperature was controlled by external cooling of the reactor. Oxygen was furnished to the autoclave as needed. The reaction proceeded through a series of exothermic cycles, and the autoclave was thereafter cooled and vented following a total pressure drop of 760 p.s.i. The product, which was isolated by filtration, contained 152.1 grams of terephthalic acid, or 91.7% of the theoretical yield.

When the procedure of Example I was repeated with the exception that the solvent medium contained 500 additional milliliters of glacial acetic acid instead of the 500 milliliters of ethyl acetate, the yield of terephthalic acid was only 62 grams, or 37.6% of the theoretical yield.

EXAMPLE II

This example illustrates the effect of using a reaction mixture containing a lower alkyl ester in a proportion lower than that used in Example I.

The procedure of Example I was repeated except that the reaction mixture contained 250 milliliters of ethyl acetate and 750 milliliters of glacial acetic acid. The yield of terephthalic acid was 104.6 grams, or 63% of the theoretical yield.

EXAMPLE III

This example illustrates the effect of using a reaction mixture containing a lower alkyl ester in a proportion lower than that used in Example II.

The procedure of Example I was repeated except that the reaction mixture contained 30 milliliters of ethyl acetate and 1000 milliliters of glacial acetic acid. The yield of terephthalic acid was 68.1 grams, or 41% of the theoretical yield.

EXAMPLE IV

This example illustrates the effect of including a methylenic ketone in the reaction mixture of this invention.

The procedure of Example I was repeated except that 21.6 grams of methyl ethyl ketone were initially present in the reaction mixture in addition to the cobalt salt, glacial acetic acid and ethyl acetate. The induction period was shortened to 60 minutes. The yield of terephthalic acid was the same as in Example I, i.e., 152 grams or 91.7% of the theoretical yield.

EXAMPLE V

This example illustrates the effect of including an aldehyde in the reaction mixture of this invention.

The procedure of Example IV was repeated except that 21.6 grams of acetaldehyde were initially present in the reaction mixture in place of the 21.6 grams of methyl ethyl ketone. There was no induction period and the yield of terephthalic acid was 144.4 grams, or 87% of the theoretical yield.

EXAMPLE VI

This example illustrates the effect of using different lower alkyl esters in place of ethyl acetate in the reaction mixture.

The procedure of Example I was repeated with a reaction mixture containing 500 milliliters of sec-butyl acetate instead of the ethyl acetate. The reaction was smooth and proceeded steadily without strong exothermic rises. The yield of terephthalic acid was 150 grams, or 90.4% of the theoretical yield.

When the procedure of Example I was repeated for comparative purposes using 500 milliliters of methyl acetate in place of the ethyl acetate, the yield of terephthalic acid was only 56 grams, or 33.7% of the theoretical yield.

EXAMPLE VII

This example illustrates the applicability of the process of this invention to methyl benzenes other than xylenes.

A 300 milliliter autoclave was charged with 13.4 grams of durene, 2.5 grams of cobalt (II) acetate tetrahydrate, 50 milliliters of sec-butyl acetate and 50 milliliters of glacial acetic acid and reacted under the conditions described in Example I. The durene was completely reacted to a mixture of durylic acid and dimethyl phthalic acids.

Although the present invention has been described with preferred embodiments, it should be understood that modifications and variations thereof may be employed without departing from the spirit and scope of this invention, as those skilled in the art will readily understand. Such variations and modifications are therefore considered to be within the purview and scope of the appended claims.

We claim:

1. In a process for the preparation of a benzene carboxylic acid by the liquid phase oxidation at elevated temperatures and elevated pressures with molecular oxygen of a methyl-substituted benzene compound to said acid in a solution containing a lower fatty acid having from 2 to 4 carbon atoms and a dissolved cobalt compound as the oxidation catalyst, the improvement which comprises incorporating in the reaction mixture an alkyl ester of a fatty acid containing at least 2 carbon atoms wherein the alkyl group contains at least 2 carbon atoms, and the amount of said ester is more than 3% of the volume of said lower fatty acid.

2. A process according to claim 1 in which the charge to the oxidation reaction contains at least about 25% by volume of each of said ester and said lower fatty acid.

3. A process according to claim 1 in which said ester is ethyl acetate.

4. A process according to claim 1 in which said ester is sec-butyl acetate.

5. A process according to claim 1 in which the charge to said oxidation reaction contains an activating quantity of an activator of the group consisting of aldehydes and methylenic ketones.

6. In a process for the preparation of terephthalic acid by the liquid phase oxidation at elevated temperatures and elevated pressures with molecular oxygen of p-xylene to said acid in a solution containing a lower fatty acid having from 2 to 4 carbon atoms and a dissolved cobalt compound as the oxidation catalyst, the improvement which comprises incorporating in the reaction mixture an alkyl ester of a fatty acid containing at least 2 carbon atoms wherein the alkyl group contains at least 2 carbon atoms, and the amount of said ester is more than 3% of the volume of said lower fatty acid.

7. A process according to claim 6 in which said ester is an alkyl acetate and said lower fatty acid is acetic acid.

8. A process according to claim 6 in which the charge to the oxidation reaction contains at least about 25% by volume of an ester of the group consisting of ethyl acetate and sec-butyl acetate and at least 25% by volume of acetic acid.

9. A process according to claim 8 in which the charge contains an activating quantity of an activator of the group consisting of methylenic ketones and aldehydes.

References Cited

UNITED STATES PATENTS 2,853,514  9/1958  Brill _____ 260—524
3,036,122  5/1962  Ardis et al. _____ 260—524

OTHER REFERENCES

Brill, Industrial and Engineering Chemistry, vol. 52, No. 10 (1960) pp. 837–840.

BERNARD HELFIN, Primary Examiner